United States Patent [19]
Moriya

[11] Patent Number: 5,892,993
[45] Date of Patent: Apr. 6, 1999

[54] LENS-FITTED PHOTO FILM UNIT

[75] Inventor: Mitsuhiro Moriya, Kanagawa, Japan

[73] Assignee: Fuji Photo Film Co., Ltd., Kanagawa, Japan

[21] Appl. No.: 20,907

[22] Filed: Feb. 9, 1998

[51] Int. Cl.$^6$ .................................................. G03B 17/24
[52] U.S. Cl. .......................................... 396/317; 396/435
[58] Field of Search ..................................... 396/315, 316, 396/317, 435, 436

[56] References Cited

U.S. PATENT DOCUMENTS 4,973,997  11/1990  Harvey .

FOREIGN PATENT DOCUMENTS 0 818 707   1/1998   European Pat. Off. .
8-160523    6/1996   Japan .
2 283 578   5/1995   United Kingdom .

Primary Examiner—David M. Gray
Attorney, Agent, or Firm—Young & Thompson

[57] ABSTRACT

A lens-fitted photo film unit has a film roll chamber, a cartridge chamber, and an exposure frame member provided between the film roll chamber and the film container chamber. The exposure frame member has an exposure aperture through which each picture frame is recorded in the same size on the filmstrip. The exposure frame member is rearwardly convex along a lengthwise direction of the filmstrip so as to support the filmstrip to be forwardly concave behind the exposure aperture, and has a forwardly concave wall portion on one margin of the exposure aperture. Data recording holes are formed through the forwardly concave wall portion, and a data recording lamp projects light toward the data recording holes at each exposure, to photographically record a number of dots on the filmstrip on one margin of the picture frame. A data switching blade mounted in the forwardly concave wall portion in front of the data recording holes. In cooperation with an operation member that is operated to select one of different print formats to each picture frame, the data switching blade covers or uncovers the data recording holes, changing the number of dots recorded for each picture frame in accordance with a print format selected by the operation member.

9 Claims, 12 Drawing Sheets 71 71

71

LENS-FITTED PHOTO FILM UNIT

BACKGROUND OF THE INVENTION

1. Field of the Invention

The present invention relates to a lens-fitted photo film units, by which picture frames can be designated to be printed in different formats within a filmstrip by optically recording print format data in association with each picture frame.

2. Background Arts

Lens-fitted photo film units, hereinafter referred to as film units, each preloaded with a photo film cartridge, are getting more popular as a user-friendly snap camera. The film unit has a film roll chamber and a cartridge chamber for holding a roll of unexposed photo filmstrip and a film container or cartridge shell respectively. An exposure frame is formed between the cartridge chamber and the film roll chamber. The filmstrip is exposed through an exposure aperture confined by the exposure frame, and is wound into the cartridge shell one frame after each exposure.

Since a cheap fixed-focus optical system is used as the taking lens of the film unit, the filmstrip is supported to be forwardly concave behind the exposure aperture in order to correct the curvature of the field. Therefore, the exposure frame is shaped to be rearwardly convex along the lengthwise direction of the filmstrip.

For handiness sake, the film unit is expected to be as compact as possible. Recent trend is to make the unit body thinner than the outer diameter of the cartridge shell except the cartridge chamber.

Recently, film units containing a new type photo film cartridge called IX 240 type or APS (Advanced Photo System) type have been brought into market. The IX 240 photo film cartridge can contain a leader of a filmstrip therein and advance it to the outside by rotating its spool in an unwinding direction. The standard frame exposure range of the filmstrip contained in the IX 240 photo film cartridge is 16.7 mm×30.2 mm.

To add amusement in the snap-photography, a print system has been provided for making photo prints in different formats, including a conventional ISO 135 standard size (C size) whose aspect ratio is about 1.5, an elongated panoramic size (P size) which is about double the ISO 135 size in length and thus has an aspect ratio of about 3.0, and a high-vision size (H size) whose aspect ratio is proximate to that of the high-vision TV screen, i.e. about 1.8. In general, the P size photo print is about 89 mm×252 mm, the H size photo print is about 89 mm×158 mm, and the C size photo print is about 89 mm×127 mm.

It is also known in the art to record every picture frame in the same size and record print format data for designating a print format to each frame concurrently with the exposure. According to this method, prints are made in the designated print formats from the same size picture frames by limiting the printing range of each frame to be correspondent to the designated print format.

As the aspect ratio of the IX 240 standard frame is about 1.8, i.e. the H size, a H size photo print is made from the standard frame. In this case, the C size photo print is made by limiting right and left portions of the IX 240 standard picture frame. On the other hand, a P size photo print is made by limiting upper and lower portions of the IX 240 standard picture frame.

In the film unit, the print format data is optically recorded as a dot pattern on the photo film on one margin of the picture frame. To record the dot pattern, a plurality of holes are formed through a wall portion of the exposure frame, and a data switching blade is mounted in front of the wall portion, so as to be slidable for covering or uncovering some of the holes.

Mounting such a plate to be slidable in front of the wall portion of the exposure frame can increase the thickness of the film unit. In addition, the data switching blade should be sufficiently close to the film surface so as the dot pattern to be recorded clearly enough for automatic discrimination of the dot pattern.

SUMMARY OF THE INVENTION

In view of the foregoing, a prime object of the present invention is to provide a film unit into which a print format selection device is compactly incorporated.

Another object of the present invention is to provide a film unit having a print format selection device which can optically record dot patterns with sufficient sharpness.

To achieve the above objects in a lens-fitted photo film unit having a film roll chamber holding a roll of unexposed photo filmstrip, a cartridge chamber holding a film container into which the filmstrip is wound up after exposure, and an exposure frame member provided between the film roll chamber and the film container chamber, the exposure frame member having an exposure aperture through which each picture frame is recorded in the same size on the filmstrip, the exposure frame member being rearwardly convex along a lengthwise direction of the filmstrip so as to support the filmstrip to be forwardly concave behind the exposure aperture, the present invention provides the film unit with an operation member operated to select one of different print formats to each picture frame; a forwardly concave wall portion of the exposure frame member formed on one margin of the exposure aperture; data recording holes formed through the forwardly concave wall portion of the exposure frame member; a light source device for photographically recording a number of dots through the data recording holes on the filmstrip on one margin of the picture frame; and a data switching blade mounted in the forwardly concave wall portion in front of the data recording holes, the data switching blade being movable in cooperation with the operation member, covering or uncovering the data recording holes to change the number of dots recorded for each picture frame in accordance with the print format selected by the operation member.

As the data switching blade is mounted in the forwardly concave wall portion of the exposure frame member, which can easily be provided complementarily to the convex rear surface of the exposure frame member, the data switching device can be assembled into the unit body without the need for any specific room therefor.

Since the data recording holes are formed through the forwardly concave wall portion of the exposure frame member, and the data switching blade is mounted in the forwardly concave wall portion, the distance from the data switching blade to the film surface becomes shorter than conventional, so that the sharpness of the dot recorded on the filmstrip is improved.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
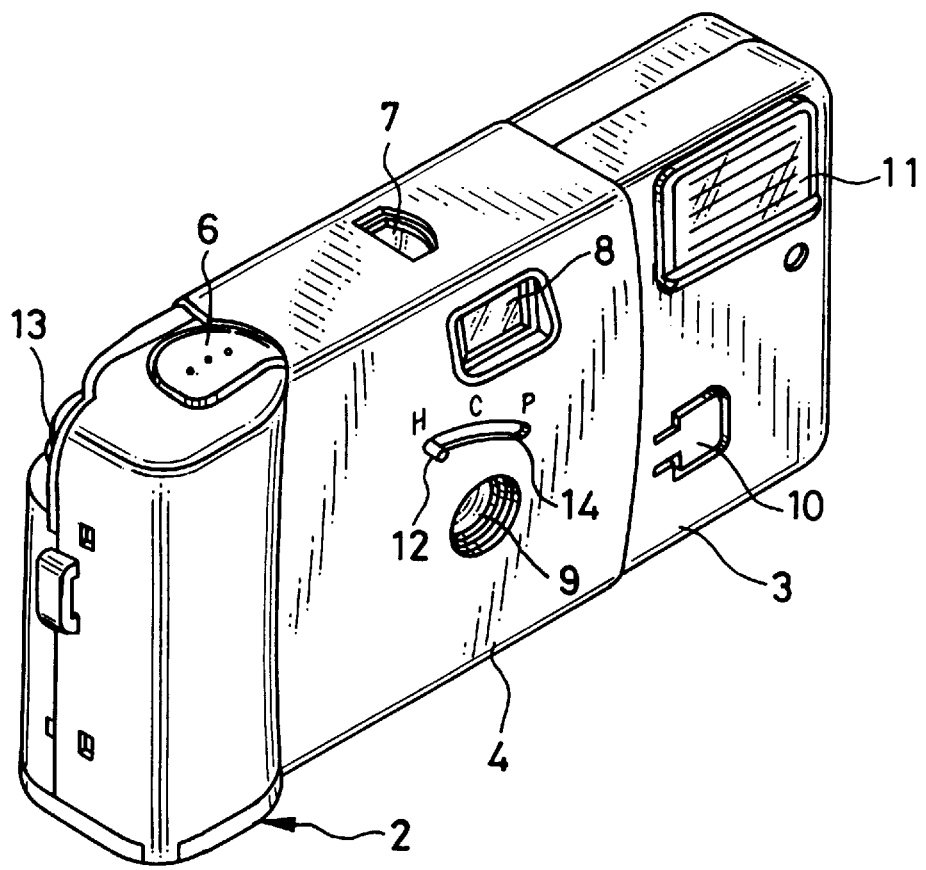
FIG. 1 is a perspective view of a film unit with a print format selection device according to a first embodiment of the invention.

In FIG. 1, a film unit 2 according to a first embodiment of the invention is constituted of a unit main body 3 containing a photo film cassette and having a simple photographic mechanism, and a wrapping 4 which is wrapped around a middle portion the unit main body 3. The unit main body 3 is provided with a shutter button 6, a frame counter window 7, a viewfinder objective window 8, a taking lens 9, a flash charge button 10 and a flash window 11. In addition, a knob 12 is provided in a front portion of the unit main body 3 so as to be slidable along a slot 14. Designated by 13 is a film winding wheel. The wrapping 4 is adhered to the unit main body 3, and has cutouts for exposing the taking lens 9, the viewfinder objective window 8, the frame counter window 7, the knob 12 and so forth to the outside.

The knob 12 is manually operated to select a print format. Characters "C", "P" and "H" printed on the wrapping 4 along the slot 14 indicate three switching positions for selecting the C size print, the P size print and the H size print respectively.

Figure 2:
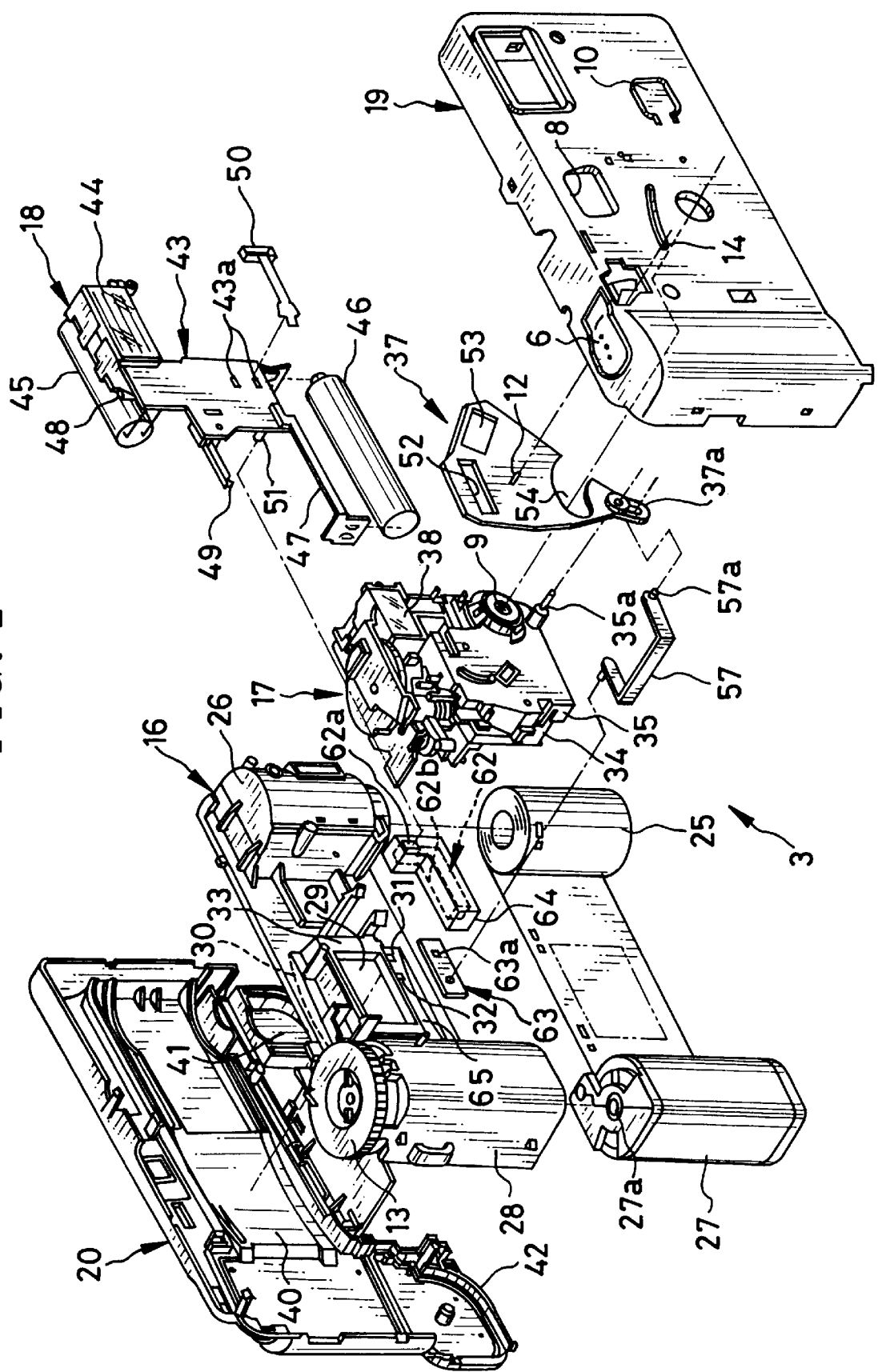
FIG. 2 is an exploded perspective view illustrating of a film unit with a print format selection device according to a third embodiment of the invention.

As shown in FIG. 2, the unit main body 3 is constituted of a basic portion 16 containing a photo film cartridge, an exposure assembly 17 and a flash assembly 18 which are attached to the front of the basic portion 16, a front cover 19 covering the front of the basic portion 16, and a rear cover 20 covering the rear of the basic portion 16. These components are assembled into the unit main body 3 by snap-in engagement.

The basic portion 16 has a film roll chamber 26 holding a roll of unexposed filmstrip 25, and a cartridge chamber 28 holding a cartridge shell 27 with a spool 27a. An exposure frame member 30 having an exposure aperture 29 and an exposure chamber 33 is formed in between the film roll chamber 26 and the cartridge chamber 28. In this embodiment, the filmstrip 25 is of IX 240 type, so the exposure aperture 29 defines a frame exposure range in the H size. The film winding wheel 13 is engaged with the spool 27a, and one end of the filmstrip 25 is secured to the spool 27a, so the filmstrip 25 is wound into the cartridge shell 27 one frame after each exposure by rotating the spool 27a through the film winding wheel 13.

The rear surface of the exposure frame member 30 is convex along the lengthwise direction of the filmstrip 25, as is shown by dashed line in FIG. 2. A forwardly concave film supporting surface 40 is formed integrally with the rear cover 20 in an area opposing to the exposure frame member 30. Thereby, the film surface is supported to be forwardly concave behind the exposure aperture 29. This is for correcting the curvature of the field.

A pair of data recording holes 31 and 32 are formed through the exposure frame member 30 in a wall portion 65 below the exposure chamber 33. Complementary to the convex rear surface of the exposure frame member 30, the wall portion 65 is forwardly concave along the lengthwise direction of the filmstrip 25. The data recording holes 31 and 32 are used for optically recording print format data in the form of a dot pattern on the filmstrip 25 below the picture frame as recorded through the taking lens 9 and the exposure aperture 29.

In the exposure assembly 17, a shutter mechanism, a film one-frame advancing mechanism and other elements necessary for exposure are mounted to a base portion 34. The taking lens 9 is held in a lens holder 35 which is also mounted to the front of the base portion 34. A pivot 35a for a view changing plate 37 is integrally formed with the lens holder 35. A viewfinder optical system including an objective lens 38 is also mounted to the base portion 34. The exposure assembly 17 is mounted to the front of the exposure chamber 33.

The front cover 19 is formed integrally with the flash charge button 10, the slot 14, the viewfinder objective window 8 and other necessary openings or cutouts. The front cover 19 is attached to the front of the basic portion 16 so as to cover the exposure assembly 17 and the flash assembly 18. The rear cover 20 closes the film roll chamber 26 and the cartridge chamber 28 from the rear side, and bottom lids 41 and 42 formed integrally with the rear cover 20 close bottoms of the chambers 26 and 28, such that the filmstrip 25 and the cartridge shell 27 are contained in the unit body 3 in a light-tight fashion.

The flash assembly 18 is constituted of a printed circuit board 43 having a pair of printed contact chips 43a and other printed circuit elements, a light emitting portion 44, a main capacitor 45, a battery holder 47, a charge indication lamp 48, a synchronizing switch 49, and other elements constituting a flash circuit. A battery 46 is held by the battery holder 47, and is accommodated below the exposure chamber 33.

A metal contact plate 50 is disposed behind the flash charge button 10, so the contact plate 50 is brought into contact with the contact chips 43a when the flash charge button 10 is depressed. Thereby, the flash circuit is closed to start charging the main capacitor 45. When the main capacitor 45 is charged up to a given level, the charge indication lamp 48 begins to wink. When the shutter button 6 is depressed and thus a not-shown shutter blade swings to make an exposure, the synchronizing switch 49 is turned on, causing the light emitting portion 44 to flash.

Furthermore, a data recording lamp 51 for use in recording the print format data is mounted to the printed circuit board 43, such that the data recording lamp 51 emits each time the synchronizing switch 49 is turned on.

The view changing plate 37, which is pivotal about the pivot 35a, has a cinematic view window 53 having an aspect ratio of 1.5, a panoramic view window 52 having an aspect ratio of 3.0, and an arced cutout 54 for exposing the taking lens 9 to the front. Centers of the view windows 52 and 53 are disposed on a circle which is coaxial with the pivot 35a, and which extends across a center of the viewfinder objective window 8.

Figure 3A:
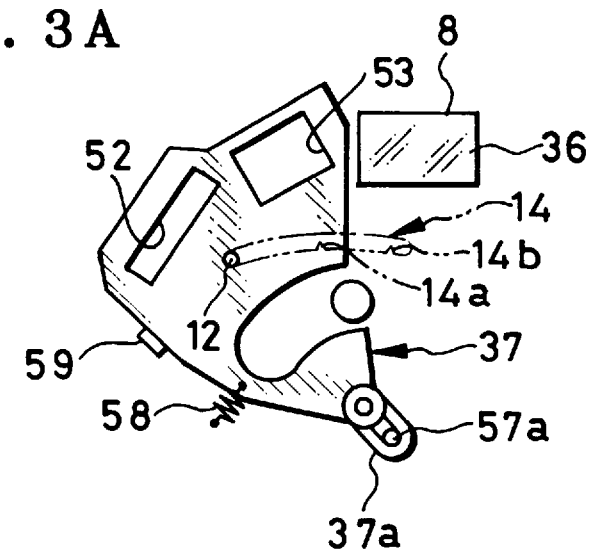
FIGS. 3A, 3B and 3C are explanatory front views of the print format selection device of the first embodiment in a high-vision position, in a cinematic position and in a panoramic position respectively.
Figure 3B:
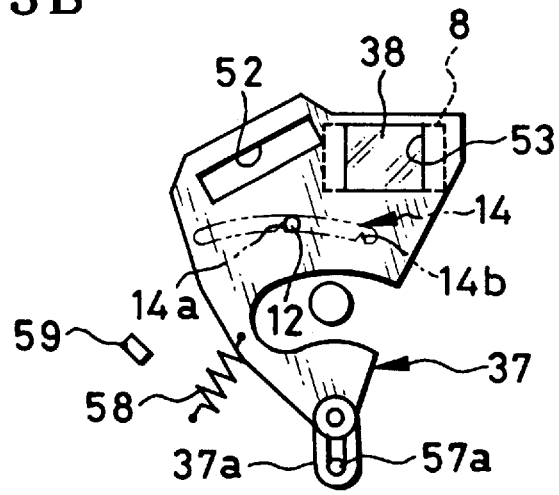
Figure 3C:
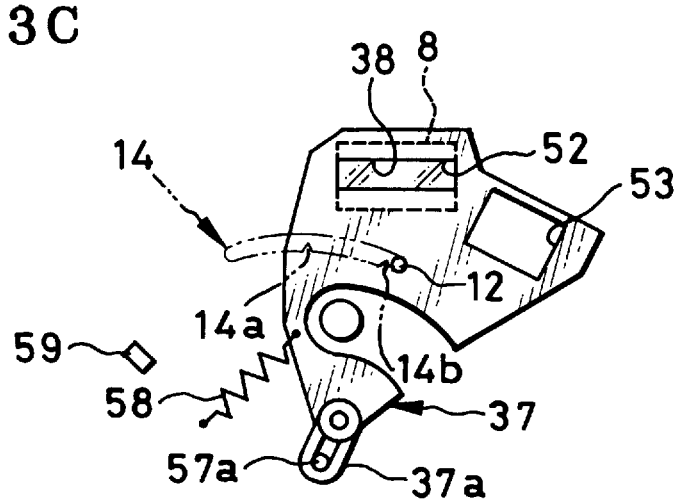

The knob 12 is integrally formed with the view changing plate 37, and protrudes through the slot 14 to the outside of the unit body 3. The viewfinder objective window 8 originally has a field of view that corresponds to the H size exposure aperture 29. That is, where the view changing plate 37 is not inserted in front of an objective lens 38 of the viewfinder 8, as shown in FIG. 3A, the view field is set in the H size. Where the cinematic view window 53 is placed right in front of the objective lens 38, as shown FIG. 3B, the view field is limited to the C size aspect ratio. Where the panoramic view window 52 is placed right in front of the objective lens 38, as shown in FIG. 3C, the view field is limited to the P size aspect ratio.

The view changing plate 37 is urged by a spring 58 to rotate in a counterclockwise direction in the drawings, but the counterclockwise rotation is limited by a stopper 59. Where the view changing plate 37 is stopped by the stopper 59, the view changing plate 37 is not placed in front of the objective lens 38 of the viewfinder 8, as shown in FIG. 3A. Clicks 14a and 14b are formed in the slot 14 for stopping the knob 12 respectively in the C size position and the P size position.

A light guide 62 is mounted to the bottom side of the exposure chamber 33. One end 62a of the light guide 62 faces the data recording lamp 51, to conduct light from the data recording lamp 51 to the other end 62b, and project the light toward the data recording holes 31 and 32. The light guide 62 is covered with a light-shielding member 64 except the ends 62a and 62b, so the light guide 62 is shielded from extraneous light that may enter at the slot 14 or at the cutout forming the shutter button 6 in the front cover 19.

Figure 4:
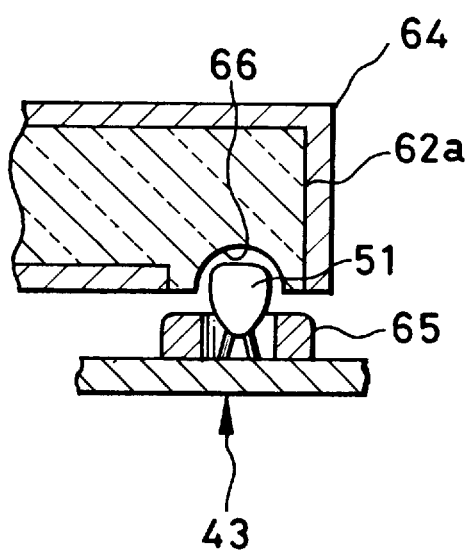
FIG. 4 is an explanatory view of a light guide used in the print format selection device of the first embodiment.

As shown in FIG. 4, the end 62a of the light guide 62 that faces the data recording lamp 51 has a recess 66 for accepting the face end portion of the data recording lamp 51. A ring-like light-shielding member 65 made of Moltplane (a trade name) is provided on the printed circuit board 43, surrounding the data recording lamp 51. The light-shielding member 65 prevents leakage of the light of the data recording lamp 51 as well as entrance of the extraneous light into the light guide 62.

The light-shielding member 64 extends toward the wall portion 65 of the exposure frame member 30 so as to surround the data recording holes 31 and 32. Thereby, the extraneous light is prevented from entering the data recording holes 31 and 32. It is possible to provide a door member for opening and closing the data recording holes 31 and 32 in cooperation with the opening and closing operation of the shutter blade, in order to eliminate the influence of the extraneous light.

Figure 5A:
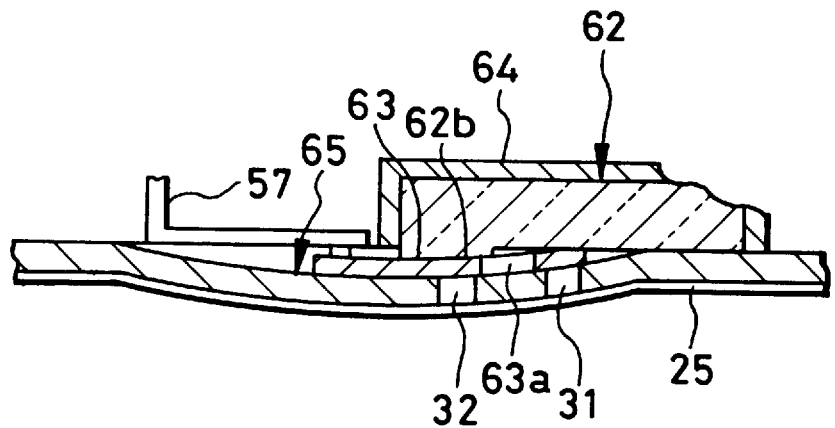
FIGS. 5A, 5B, and 5C are explanatory views illustrating the operation of a data switching blade of the print format selection device of the first embodiment.
Figure 5B:
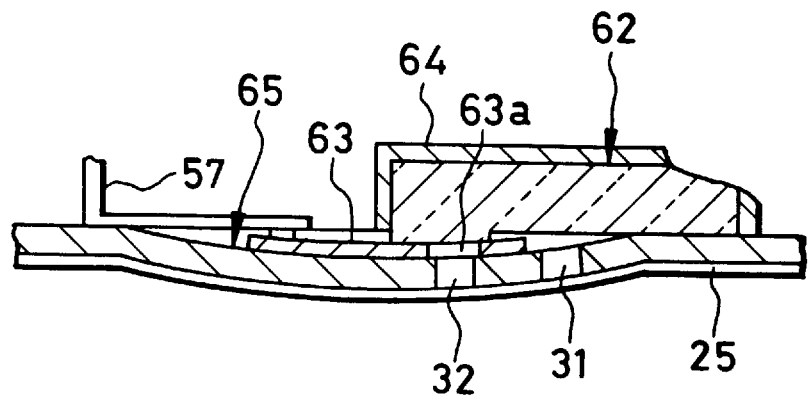
Figure 5C:
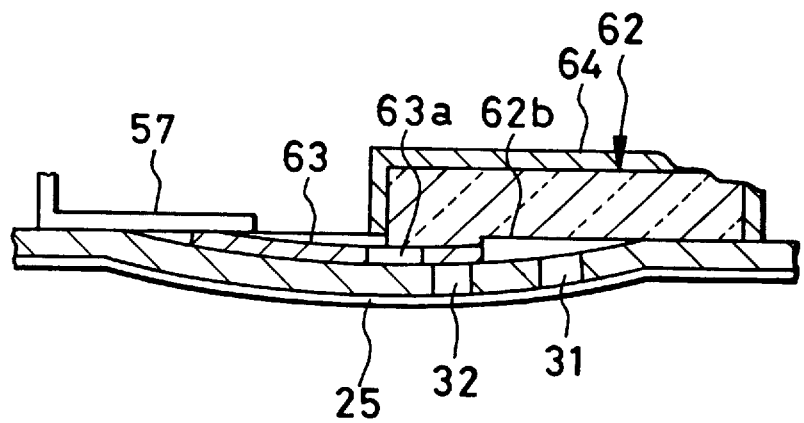

As shown in FIGS. 5A to 5C, a data switching blade 63 with an opening 63a is mounted to be slidable in between the end 62b of the light guide 62 and the data recording holes 31 and 32. The data switching blade 63 is made of an opaque flexible sheet material, e.g. highly elastic Somablack (a trademark). The data switching blade 63 and the interconnection rod 57 constitute a data switching device. The data recording holes 31 and 32, the data recording lamp 51, the light guide 62, and the data switching device constitute a print format data recording device.

The data switching blade 63 is coupled to the view changing plate 37 through an interconnection rod 57. A pin member 57a formed on one end of the interconnection rod 57 is engaged with a coupling end 37a of the view changing plate 37, as shown in FIGS. 3A to 3C. As the view changing plate 37 rotates about the pivot 35a, the data switching blade 63 slides in the lengthwise direction of the filmstrip 25 along the forwardly concave wall portion 65 below the exposure chamber 33.

Figure 6A:
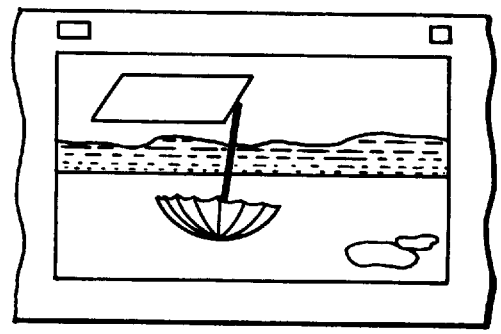
FIGS. 6A, 6B and 6C are explanatory views illustrating dot patterns as an example of print format data.

When the knob 12 is set in the H size switching position, the data switching blade 63 slides to a position where the opening 63a is located between the data recording holes 31 and 32, so that both holes 31 and 32 are closed by the data switching blade 63, as shown in FIG. 5A. Accordingly, even though the light from the data recording lamp 51 is projected from the end 62b of the light guide 62 synchronously with the exposure, no dot is recorded on the filmstrip 25, as shown in FIG. 6A.

Figure 6B:
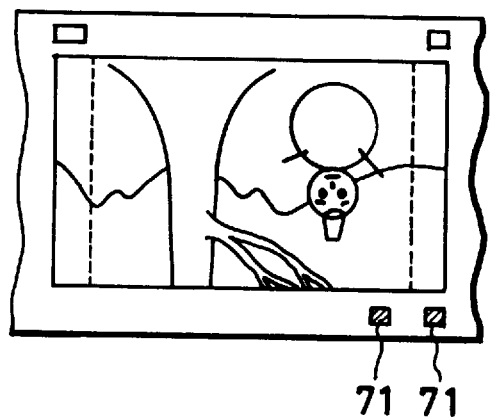

When the knob 12 is set in the C size switching position, the data switching blade 63 is retracted from the front of the data recording hole 31, and the opening 63a of the data switching blade 63 comes into alignment with the data recording hole 32, as shown in FIG. 5B. Accordingly, when the light is projected from the light guide 62, two dots 71 are recorded on the filmstrip 25 on one margin of the picture frame, as shown in FIG. 6B.

Figure 6C:
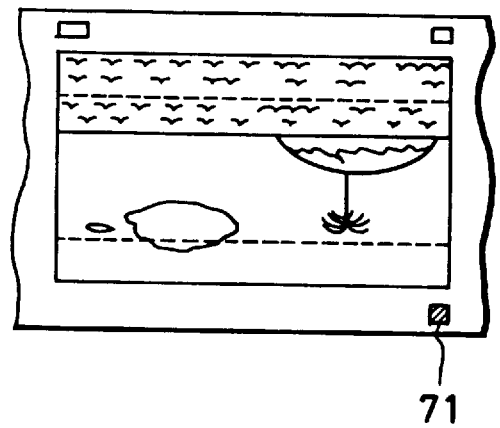

When the knob 12 is set in the P size switching position, the data switching blade 63 is retracted from the front of the data recording hole 31, but the opening 63a of the data switching blade 63 is also retracted from the front of the data recording hole 32, as shown in FIG. 5C. Accordingly, when the light is projected from the light guide 62, only one dot 71 is recorded on the filmstrip 25, as shown in FIG. 6C.

As the data switching blade 63 is mounted to be slidable on the forwardly concave wall portion 65 of the exposure frame member 30, which can easily be provided complementarily to the convex rear surface of the exposure frame member 30, the data switching device can be assembled into the unit body 3 without the need for any specific room therefor. In addition, since the light guide 62 and the battery 46 are disposed below the exposure chamber 33, the print format selection device having the above configuration may be incorporated into the unit body 3 with a minimum increase in the thickness of the unit body 3.

The film unit 2 having the above constructions operates as follows:

First the film winding wheel 13 is rotated to set an initial frame exposure range of the filmstrip 25 in an exposure position behind the exposure aperture 29. Thereafter, the knob 12 is set in one of the H size, C size and P size switching positions.

When the knob 12 is set in the H size switching position, the view changing plate 37 is retracted from the front of the viewfinder objective lens 38, so that the viewfinder objective lens 38 provides the H size view field. On the other hand, the opening 63a of the data switching blade 63 is located between the data recording holes 31 and 32. When the photographer depresses the shutter button 6 while framing the photographic field through the H size view field, the shutter blade opens for a given time to expose the filmstrip 25. In cooperation with the shutter blade, the synchronizing switch 49 is turned on, causing the data recording lamp 51 to emit.

The light from the lamp 51 is conducted from the end 62a to the end 62b of the light guide 62, and is projected toward the data recording holes 31 and 32. Since these holes 31 and 32 are closed by the data switching blade 63, no dot is recorded on the filmstrip 25, as shown in FIG. 6A. Therefore, no dot represents print format data designating the H size photo print. If the flash charge switch 10 is depressed at that time, the light emitting portion 44 also flashes in response to the synchronizing switch 49 being turned on.

When the knob 12 is set in the C size switching position, the view changing plate 37 rotates in the clockwise direction, to insert the cinematic view window 53 in front of the viewfinder objective lens 38, providing the C size view field. In cooperation with the clockwise rotation of the view changing plate 37, the data switching blade 63 slides to position the opening 63a in front of the data recording hole 32. In this position, the data switching blade 63 uncovers the data recording hole 31. When the photographer depresses the shutter button 6 while framing the photographic field through the C size view field, the data recording lamp 51 emits synchronously with the exposure, so that two dots 71 are recorded on the filmstrip 25, as shown in FIG. 6B. Therefore, two dots 71 represent print format data designating the C size photo print.

When the knob 12 is set in the P size switching position, the view changing plate 37 rotates further in the clockwise direction, to insert the panoramic view window 52 in front of the viewfinder objective lens 38, providing the P size view field. In cooperation with the view changing plate 37, the data switching blade 63 slides to the position shown in FIG. 5C, so that one dot 71 is recorded on the filmstrip 25 through the data recording hole 31, as shown in FIG. 6C, synchronously with the shutter button 6 being depressed. Therefore, one dot 71 represents print format data designating the P size photo print.

After the exposure of all available picture frames, the film unit 2 is forwarded to a photo finisher, wherein the filmstrip 25 after being developed is put in an automatic printer. The automatic printer is provided with a sensor or the like for scanning the print format data on the margin of each picture frame. If the sensor detects two dots 71 for one picture frame, the picture frame is printed in the C size. If the sensor detects one dot 71 for another picture frame, the picture frame is printed in the P size. If no dot is detected, the picture frame is printed in the H size.

Figure 7:
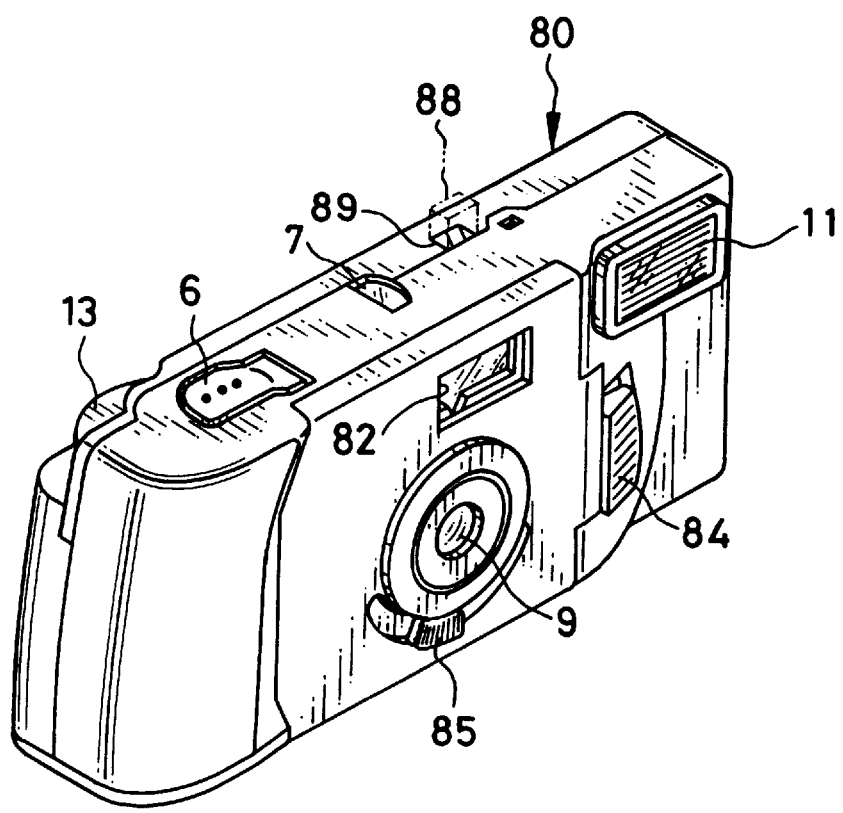
FIG. 7 is a perspective view of a film unit with a print format selection device according to a second embodiment of the invention.

FIG. 7 shows a film unit 80 according to a second embodiment of the invention. The film unit 80 is provided with a shutter button 6, a frame counter window 7, a viewfinder 8, a taking lens 9, a flash window 11, and a film winding wheel 13. In addition, a charge switch operation device 84 is disposed below the flash window 11, and a knob 85 is provided below the taking lens 9 so as to be slidable along an arced slot 130 (see FIG. 9) around the taking lens 9. On one side of the frame counter window 7 is formed an indication window 89 for a charge condition indicator 88.

Figure 8:
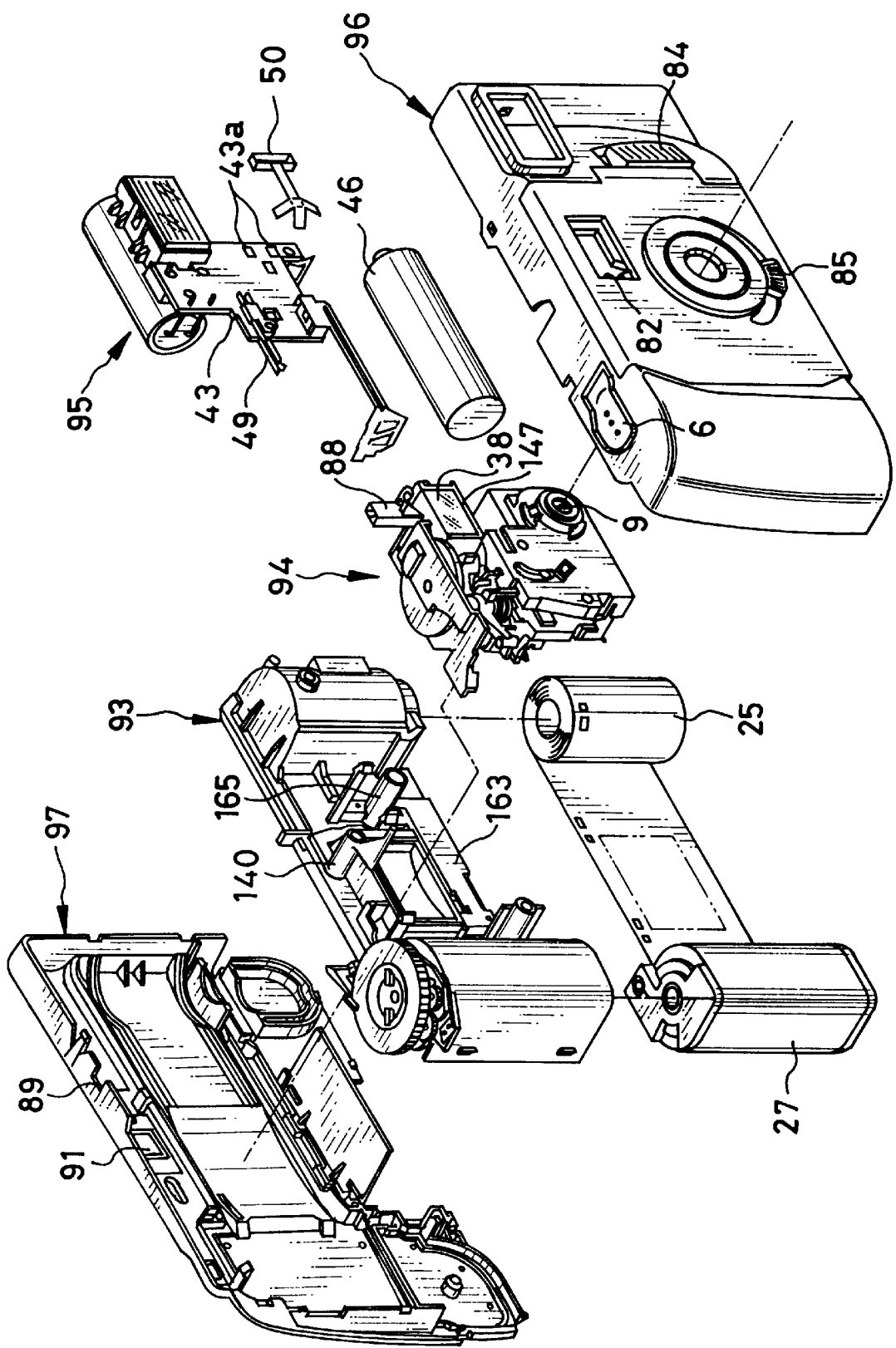
FIG. 8 is an exploded perspective view of the film unit shown in FIG. 7.

As shown in FIG. 8, the film unit 80 is constituted of a basic portion 93 and an exposure assembly 94 and a flash assembly 95 which are attached to the front of the basic portion 93. The basic portion 93 contains a roll of photo filmstrip 25 and a film container 27, in the same way as in the first embodiment. A front cover 96 covers the front of the basic portion 93, and a rear cover 97 covers the rear of the basic portion 93. The fundamental constructions of these parts 93 to 97 are equivalent to those having the same names in the above embodiments. Accordingly, the following description will relates merely to those elements essential for the second embodiment.

The charge switch operation device 84 is slidable in a vertical direction, and is moved to an upper position for the flash photography. Then, the charge condition indicator 88 pops up through the indication window 89 as is implied by the phantom lines in FIG. 7. The charge condition indicator 88 starts lighting when the flash assembly 95 completes charging.

Figure 9:
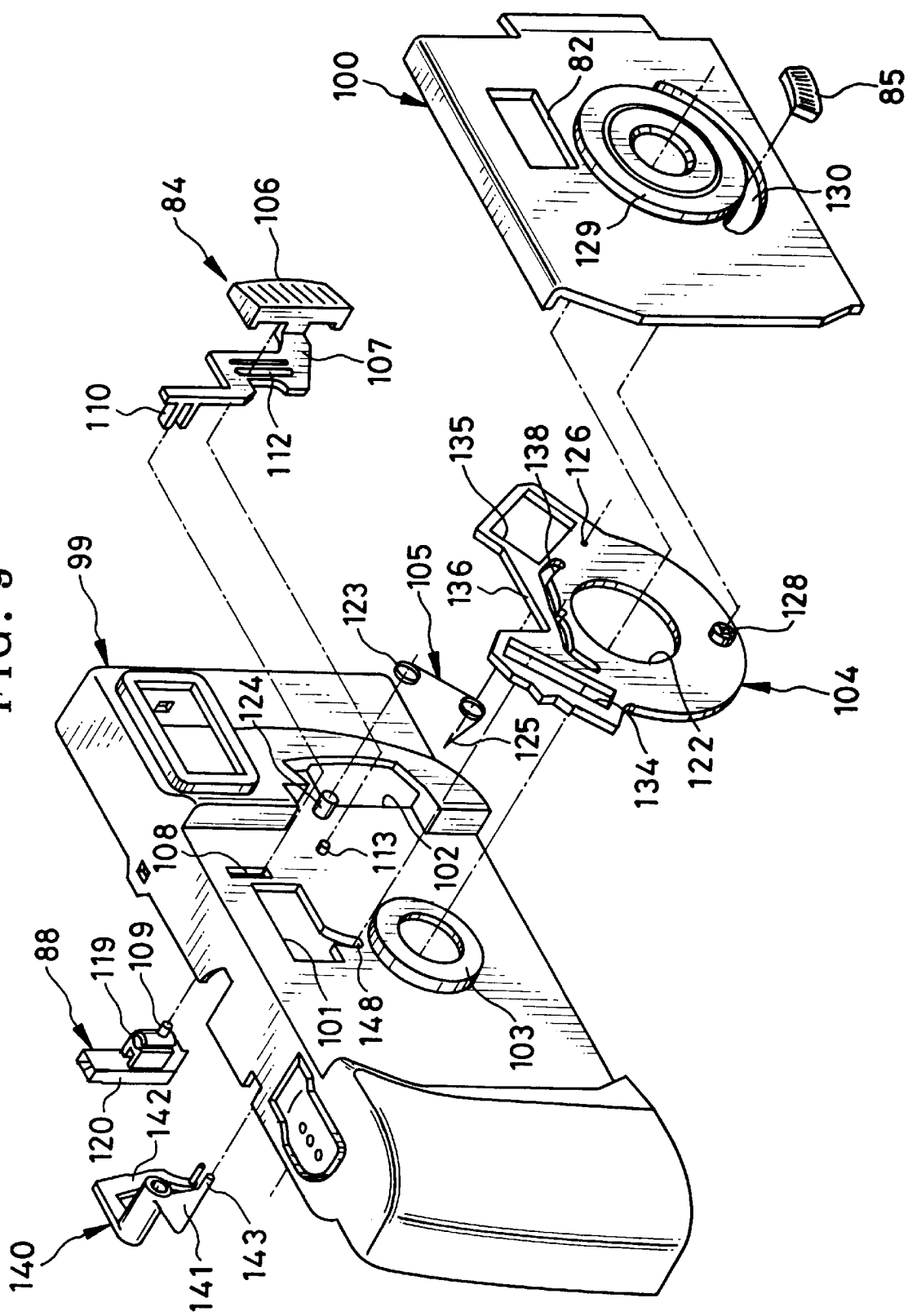
FIG. 9 is an exploded perspective view of a front cover of the film unit shown in FIG. 7, illustrating a view changing plate of the print format selection device of the second embodiment.

As shown in FIG. 9, the front cover 96 consists of a cover main body 99 and a front panel 100. The cover main body 99 has a finder window 101 that is disposed in front of an objective lens 38 of the viewfinder 8, and the front panel 100 has an objective window 82 that is equal in shape and size to the finder window 101, and is disposed in alignment with the finder window 101. The charge switch operation device 84 is mounted in between the front panel 100 and the main cover body 99 at front of an opening 102 formed through the cover main body 99. A view changing plate 104 is fitted on a cylindrical lens barrel 103 so as to be rotatable about an optical axis of the taking lens 9. A toggle spring 105 is suspended between the view changing plate 104 and the cover main body 99.

The charge switch operation device 84 has a button member 106 that is exposed to the outside, a base plate 107 that is mounted to the front of the cover main body 99, and an engaging portion 110 that is inserted in a vertical slot 108 formed through the cover main body 99, and is engaged with a pin 109 formed on a front side of the charge condition indicator 88. The charge switch operation device 84 is thus slidable along the vertical slot 108.

The base plate 107 has a vertical slot 112, which accepts a pin 113 that is formed on the front of the cover main body 99. The vertical slot 112 has notches, so that the pin 113 clicks with the notch while the charge switch operation device 84 is slid up and down.

The button member 106 is disposed in front of the opening 102, and has a not-shown boss in its rear side. When the button member 106 is moved to the upper position, the boss pushes a contact plate 50 onto a pair of printed contact chips 43a formed on a printed circuit board 43 of the flash assembly 95. Thereby the flash assembly 95 is kept being charged so long as the charge switch operation device 84 is set in the upper position.

The charge condition indicator 88 is formed from a transparent plastic material, and is attached to the exposure assembly 94 through a mounting sleeve 119. The pin 109 is formed on the front surface of the mounting sleeve 119. The charge condition indicator 88 further has a light guide portion 120. In the upper position of the charge switch operation device 84, the light guide portion 120 faces an indication lamp element of the flash assembly 95, which is not shown but mounted to the rear side of the printed circuit board 43 and emits light for indicating the completion of charging. The light from the indication lamp element is conducted through the light guide portion 120, and is projected to the outside of the film unit 80 through an upper end of the light guide portion 120 that pops up from the indication window 89.

The view changing plate 104 is formed from the same plastic material that is used for forming the cover main body 99 and the front panel 100. The view changing plate 104 has a round hole 122 which is coaxial with the optical axis 9a of the taking lens 9 when fitted on the lens barrel 103, and a small hole 126 for inserting one end 125 of the toggle spring 105. An opposite coiled end 123 of the toggle spring 105 is fitted on a pin 124 that is formed on the cover main body 99.

A boss 128 is integrally formed on a lower front portion of the view changing plate 104. The boss 128 is inserted in the arced slot 130 that is formed under a ring-like lens hood 129 that protrudes forward from the front panel 100. The knob 85, which is larger than the boss 128, is attached from the front to the boss 128. Separating the knob 85 from the view changing plate 104 in this way allows to make the slot 130 narrower while maintaining good handling properties of the knob 85. The narrower slot 130 is desirable for the interest of keeping the interior of the film unit 80 from ambient light.

The view changing plate 104 has in its peripheral portions a panoramic view window 134 corresponding to the P size print format and a cinematic view window 135 corresponding to the C size print format, and a cutout 136 disposed between these windows 134 and 135. By operating the knob 85 to rotate the view changing plate 104, one of the panoramic view window 134, the cinematic view window 135 and the cutout 136 is placed in front of the objective lens 38 of the viewfinder 8, i.e. in between the objective window 82 and the finder window 101.

Figure 10:
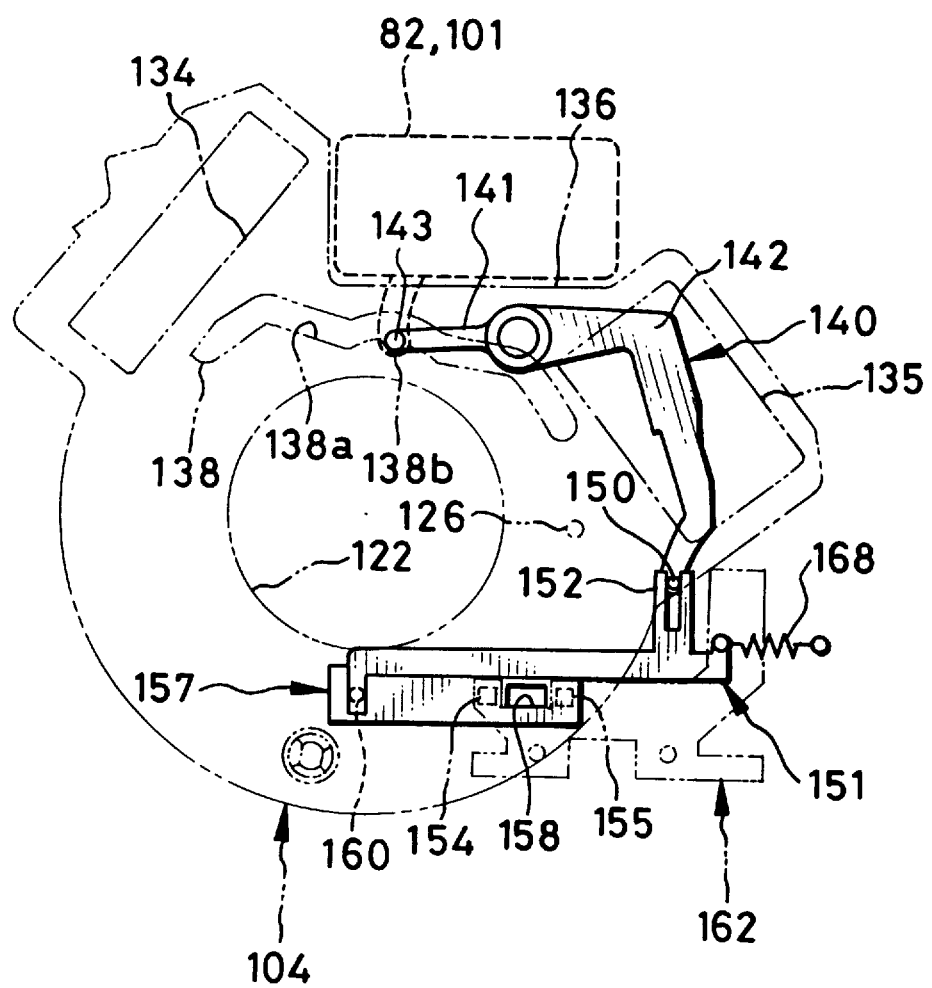
FIG. 10 is an explanatory front view of the print format selection device of the second embodiment in a high-vision position.

Also in this film unit 80, every picture frame is recorded in the H size, so that an eyepiece window 91 and the objective window 82 and thus the finder window 101 are designed to provide a H size view field corresponding to the H size photographic field. The cutout 136 of the view changing plate 104 is so sized that it does not interfere in the H size view field when it is placed in between the objective window 82 and the finder window 101, as shown in FIG. 10. The film unit 80 is initially set in a state where the cutout 136 is placed in between the objective window 82 and the finder window 101, so that the viewfinder 8 initially provides the H size view field.

Figure 11:
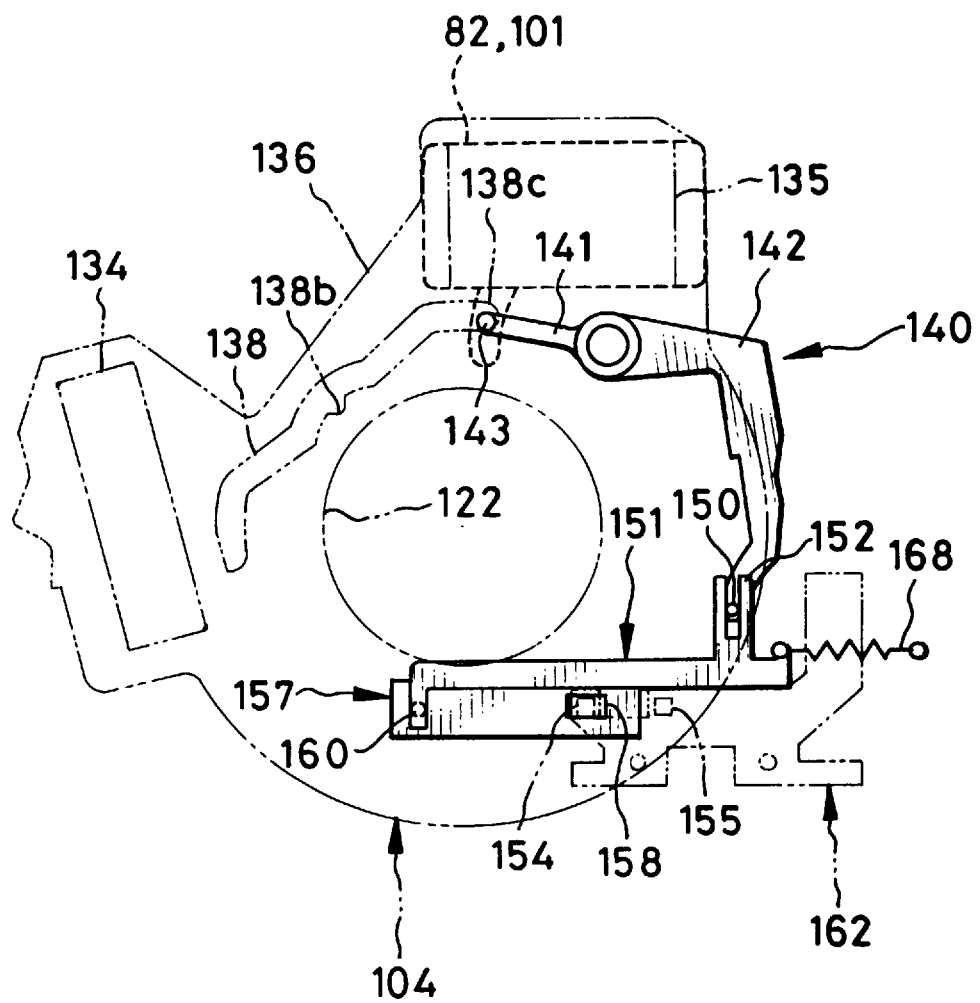
FIG. 11 is an explanatory front view of the print format selection device of the second embodiment in a cinematic position.
Figure 12:
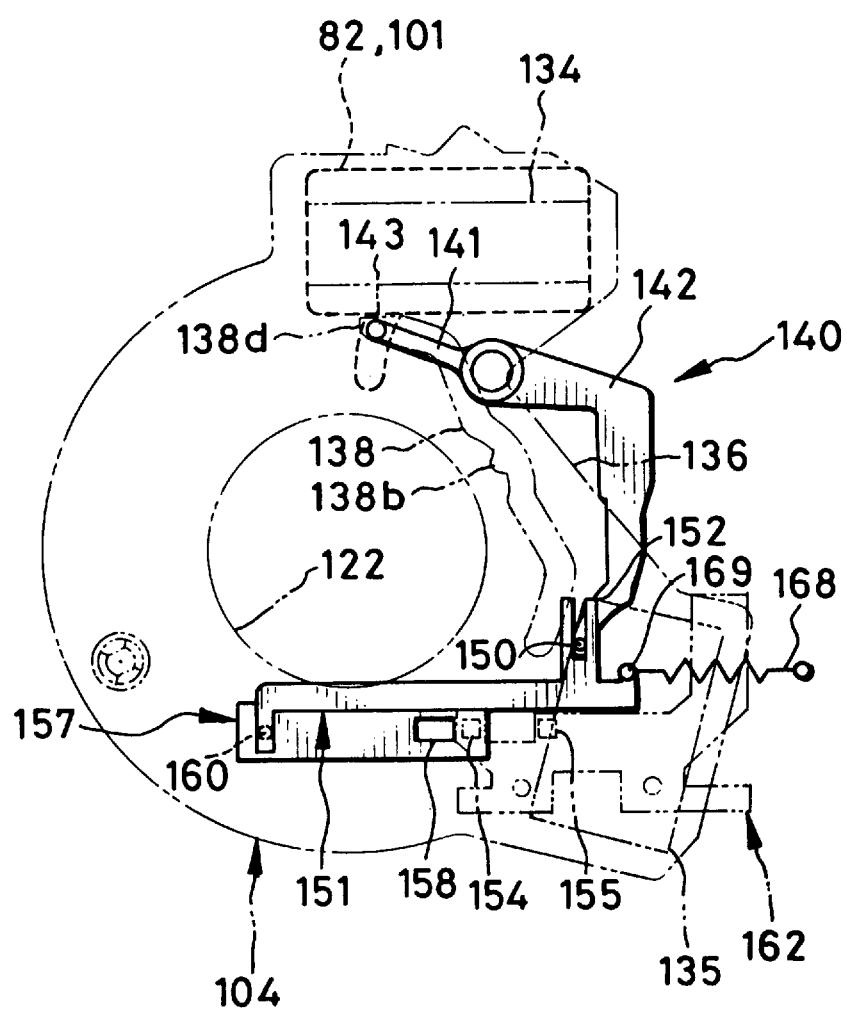
FIG. 12 is an explanatory front view of the print format selection device of the second embodiment in a panoramic position.

When the cinematic view window 135 is inserted in between the objective window 82 and the finder window 101, the field of view of the viewfinder 8 is limited to the C size, as shown in FIG. 11. When the panoramic view window 134 is inserted in between the objective window 82 and the finder window 101, the field of view of the viewfinder 8 is limited to the P size, as shown in FIG. 12.

The toggle spring 105 is adapted to stop the view changing plate 104 at either of the opposite terminal positions providing the C size and P size view fields. As the cutout 136 is disposed between the windows 134 and 135 in the view changing plate 104, a less rotational movement of the knob 85 is necessary for changing the field of view from the H size to either of other two sizes.

A cam slot 138 is formed in a peripheral range around the round hole 122 from the panoramic view window 134 to the cinematic view window 135. The cam slot 138 has a lot of twists, so the distance of the cam slot 138 from the center of the round hole 122, i.e. from the optical axis 9a of the taking lens 9 varies. As shown in FIGS. 9 to 12, the cam slot 138 accepts a pin 143 which is formed on a tip of an arm 141 of a rotary lever 140.

Figure 13:
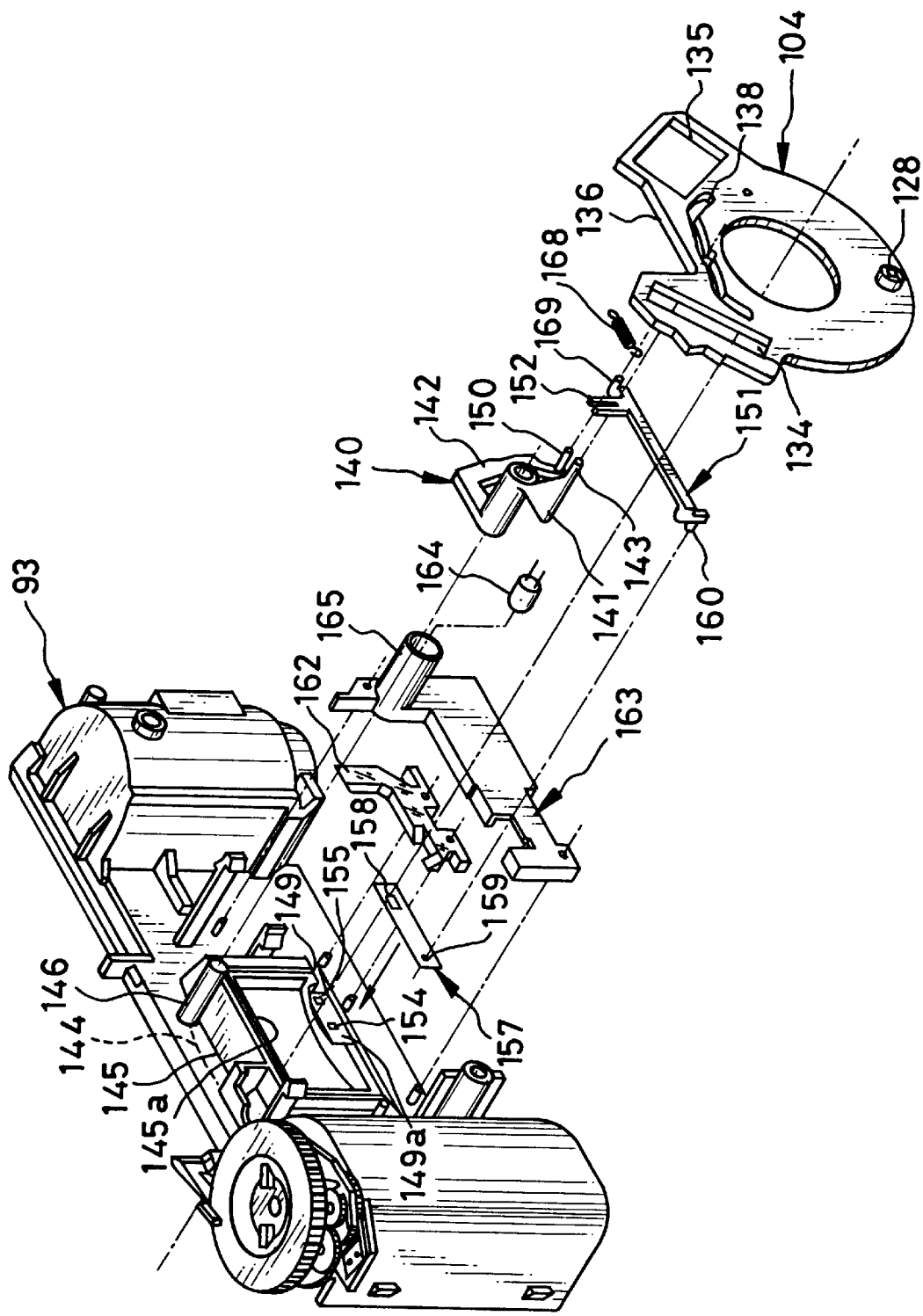
FIG. 13 is an exploded perspective view of the print format selection device of the second embodiment.

As shown in FIG. 13, the rotary lever 140 is mounted to be rotatable on an axle 146 that is formed on an upper front portion of an exposure frame member 144 that is disposed in a middle of the basic portion 93. The arm 141 of the rotary lever 140 protrudes forward from the exposure chamber 145, and a room for allowing the arm 141 to swing is formed under a lens frame 147 of the viewfinder 8 that is incorporated into the exposure assembly 94, as is shown in FIG. 8. A slit 148 is formed in a bottom side of the finder window 101, as shown in FIG. 9, so the pin 143 is inserted into the cam slot 138 of the view changing plate 104 through the slit 148. In this way, the rotary lever 140 rotates as the view changing plate 104 rotates.

The rotary lever 140 has a second arm 142 which extend along the right side of the exposure chamber 145 in the drawings, and has a pin 150 on its tip. The pin 150 is engaged with a fork 152 on one end of a slide lever 151. The slide lever 151 is mounted below the exposure chamber 145 so as to be slidable in a horizontal direction. Accordingly, the slide lever 151 slides with the rotation of the rotary lever 140.

As shown in FIG. 13, the exposure frame member 144 is formed to be rearwardly convex along the horizontal direction of the film unit 80, i.e. the lengthwise direction of the filmstrip, such that the filmstrip 25 is supported to be forwardly concave behind an exposure aperture 145a. Therefore, it is possible to provide a forwardly concave wall portion below the exposure chamber 145. The forwardly concave wall portion 149 has a flat surface 149a, through which a pair of data recording holes 154 and 155 are formed for photographically recording at most two dots as print format data on the filmstrip 25. A data switching blade 157 made of thin opaque plastic film or the like is mounted to be slidable in the horizontal direction in front of the flat surface 149a behind a battery 46. A pin 160 formed on the rear side of the slide lever 151 is fitted in a hole 159 of the data switching blade 157, so that the data switching blade 157 slides horizontally along with the slide lever 151. The data switching blade 157 has an opening 158 for uncovering the data recording hole 154 at a determined sliding position thereof.

A transparent plastic light guide 162 is disposed in front of the data switching blade 157, with its one end facing the data recording holes 154 and 155. The other end of the light guide 162 faces a data recording lamp or light emitting element 164, e.g. an LED, which is mounted to the rear side of the printed circuit board 43 of the flash assembly 95. The light emitting element 164 is connected to the circuit of the flash assembly 95 such that the light emitting element 164 is activated to emit light by a trigger signal that is generated when a synchronizing switch 49 of the flash assembly 95 is turned upon depression of the shutter button 6, regardless of whether the flash assembly 95 is charged or not. The light from the emission element 164 travels through the light guide 165, and is projected toward the data recording holes 154 and 155.

A light shielding plate 163 is disposed in front of the light guide 162 to shield the light guide 162 and the data recording holes 154 and 155 from extraneous light that may enter the interior of the film unit 80. The light shielding plate 163 also has a cylindrical portion 165 for accepting the light emitting element 164. A not-shown light-shielding member, such as Moltplane, is provided around the face end of the light emitting element 164 in order to make the joint between the cylindrical portion 165 and the light emitting element 164 light-tight. Thereby, the cylindrical portion 165 prevents the leakage of the light from the light emitting element 164 to other internal portions of the film unit 80, and also prevents the extraneous light from reaching the data recording holes 154 and 155.

The slide lever 151 is disposed in front of the light shielding plate 163. A coiled spring 168 is suspended between a pin 169 of the slide lever 151 and the light shielding plate 163, to bias the slide lever 151 to the right in the drawings. In this way, the pin 143 of the rotary lever 140 is kept in contact with an inward cam surface 138a of the cam slot 138 of the view changing plate 104, as is shown in FIGS. 10 to 12, which ensures the rotational movement of the view changing plate 104 to be transmitted to the data switching blade 157. A click notch 138b is formed in the inward cam surface 138a at a middle position of the cam slot 138.

When the knob 85 is placed in the H size position, the pin 143 clicks in the click notch 138b to stop the view changing plate 104 in the H size position as shown in FIG. 10, where the data switching blade 157 closes both of the data recording holes 154 and 155, so that no dot is recorded on the margin of a photographed picture frame, in the same way as shown in FIG. 6A.

When the knob 85 is placed in the C size position, the view changing plate 104 is urged by the toggle spring 105 to rotate in the counterclockwise direction in the drawings, so that one terminal 138c of the cam slot 138 comes into contact with the pin 143 of the rotary lever 140. In this position, the data switching blade 157 is retracted from the data recording hole 155, and the opening 158 of the data switching blade 157 is placed in front of the data recording hole 154, as shown in FIG. 11, so that two dots are recorded on the margin of a photographed picture frame, in the same way as shown in FIG. 6B.

When the knob 85 is placed in the P size position, the view changing plate 104 is urged by the toggle spring 105 to rotate in the clockwise direction in the drawings, so that the other terminal 138d of the cam slot 138 comes into contact with the pin 143, as shown in FIG. 12. In this position, the data switching blade 157 moves away from the data recording hole 155, and the opening 158 of the data switching blade 157 is retracted from the data recording hole 154 to close it, so that only one dot is recorded through the data recording hole 155 on the margin of a photographed picture frame, in the same way as shown in FIG. 6C.

As described so far, the rotary lever 140, the slide lever 151, the data switching blade 157, the data recording holes 154 and 155, the light guide 162 and the light emitting element 164 constitute a print format data recording device, and the print format data recording device, the view changing plate 104 and the knob 85 constitute the print format selection device. Since the print format data recording device is disposed around the exposure chamber 145 and between the exposure frame member 144 and the battery 46, the print format selection device is very compactly incorporated into the unit body of the film unit 80. Since the data switching blade 157 is disposed in the forwardly concave wall portion 149 of the exposure frame member 144, the distance from the data switching blade 157 to the film surface becomes shorter than conventional, so that the sharpness of the dot recorded on the filmstrip 25 is improved. In addition, the necessary amount of sliding of the data switching blade 157 may be shorter than conventional.

Although the data switching blade has a single opening in the above embodiments, it is possible to use a data switching blade with no opening, or with two openings.

The present invention has been described with respect to the film units containing the IX 240 type photo film cartridge, the present invention is of course applicable to a film unit containing the ISO 135 type photo film cartridge and a compact camera as well.

The number and types of available print formats are not limited to the above three sizes. In either case, it is preferable to make the original or unmasked view field of the viewfinder correspond to an original exposure aperture of the film unit or the camera. Also the correlation between the number of dots and the print formats is not limited to the above embodiment. The shape of data recording holes and thus dots may be other than rectangular, e.g. round or triangular.

Thus, the present invention should not be limited to the embodiments shown in the drawings but, on the contrary, variations and modifications are possible without departing from the scope of the present invention as specified in the appended claims.

What is claimed is:

1. A lens-fitted photo film unit having a film roll chamber holding a roll of unexposed photo filmstrip, a cartridge chamber holding a film container into which the filmstrip is wound up after exposure, and an exposure frame member provided between the film roll chamber and the film container chamber, the exposure frame member having an exposure aperture through which each picture frame is recorded in the same size on the filmstrip, the exposure frame member being rearwardly convex along a lengthwise direction of the filmstrip so as to support the filmstrip to be forwardly concave behind the exposure aperture, the film unit comprising:

an operation member operated to select one of different print formats to each picture frame;

a forwardly concave wall portion of the exposure frame member formed on one margin of the exposure aperture;

data recording holes formed through the forwardly concave wall portion of the exposure frame member;

a light source device for photographically recording a number of dots through the data recording holes on the filmstrip on one margin of the picture frame; and a data switching blade mounted in the forwardly concave wall portion in front of the data recording holes, the data switching blade being movable in cooperation with the operation member, covering or uncovering the data recording holes to change the number of dots recorded for each picture frame in accordance with the print format selected by the operation member.

2. A lens-fitted photo film unit according to claim 1, wherein the data switching blade has at least an opening and is slidable on the forwardly concave wall portion so as to change the position of the opening relative to the data recording holes.

3. A lens-fitted photo film unit according to claim 2, wherein the data switching blade is made of an opaque flexible sheet.

4. A lens-fitted photo film unit according to claim 1, wherein the forwardly concave wall portion is provided on a bottom margin of the exposure aperture, and the data recording holes are arranged along the lengthwise direction of the filmstrip, whereas the data switching blade is slidable in the lengthwise direction of the filmstrip.

5. A lens-fitted photo film unit according to claim 4, further comprising a flash device and a battery for charging the flash device, the battery being placed in front of the data switching blade below an exposure chamber that is provided in front of the exposure aperture to conduct light from a taking lens to the filmstrip.

6. A lens-fitted photo film unit according to claim 5, further comprising an interconnection device between the data switching blade and the operation member, and a view changing plate disposed in a front position of the film unit, the operation member being provided on the view changing plate such that the view changing plate is rotated by the operation member to change the size of view field in accordance with the print format selected by the operation member.

7. A lens-fitted photo film unit according to claim 6, wherein the view changing plate is rotatable about an optical axis of the taking lens and has a cam slot formed in a range above the taking lens, and the interconnection device comprises a rotary lever rotatable about an axis that extends parallel to the optical axis of the taking lens above the exposure aperture, and a slide lever that is mounted below the exposure chamber to slide together with the data switching blade, the rotary lever having two arms, one arm extending forward above the exposure chamber and being engaged with the cam slot of the view changing plate, the other arm extending downward along one side of the exposure chamber and being coupled to the slide lever.

8. A lens-fitted photo film unit according to claim 5, wherein the light source device comprises a light emitting element mounted on a printed circuit board of the flash device, and a light guide extending from the light emitting element along a side margin of the exposure aperture to the front of the data switching blade, the data switching blade passes or blocks light projected from the light guide toward the data recording holes.

9. A lens-fitted photo film unit according to claim 8, further comprising a light shielding member that covers the light guide in a light tight fashion, wherein the light emitting element protrudes into the light shielding member at one end of the light guide, to prevent light of the light emitting element from leaking.

* * * * *

UNITED STATES PATENT AND TRADEMARK OFFICE
CERTIFICATE OF CORRECTION

PATENT NO. : 5,892,993  
APPLICATION NO. : 09/020907  
DATED : April 6, 1999  
INVENTOR(S) : Mitsuhiro Moriya Page 1 of 1

It is certified that error appears in the above-identified patent and that said Letters Patent is hereby corrected as shown below:

On the title page, insert Item [30] as follows:

-- [30]      Foreign Application Priority Data

February 19, 1997   [JP]      Japan . . . .9-35168--.

Signed and Sealed this

Seventeenth Day of April, 2007

JON W. DUDAS  
*Director of the United States Patent and Trademark Office*